Figure 1:
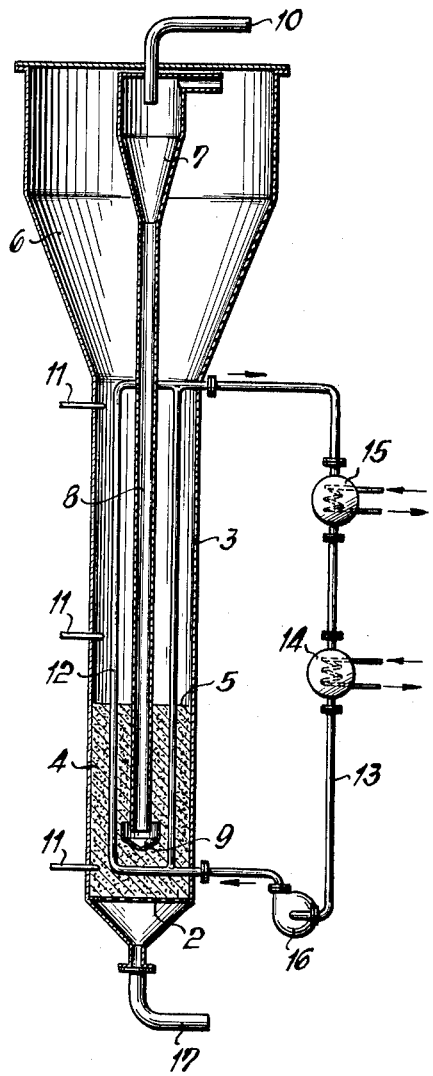

Dec. 28, 1965 K. SENNEWALD ETAL 3,226,422
PROCESS FOR PREPARING UNSATURATED NITRILES
Filed April 15, 1964 2 Sheets-Sheet 1

INVENTORS:
Kurt Sennewald,
Wilhelm Vogt,
Joachim Kandler,
Rolf Sommerfeld.
& Günter Sorbe.
BY Connolly and Hutz
ATTORNEYS INVENTORS
Kurt Sennewald,
Wilhelm Vogt,
Joachim Kandler,
Rolf Sommerfeld
& Günter Sorbe.
BY Connolly and Hutz
ATTORNEYS

United States Patent Office 3,226,422
Patented Dec. 28, 1965

3,226,422
PROCESS FOR PREPARING UNSATURATED NITRILES
Kurt Sennewald and Wilhelm Vogt, Knapsack, near Cologne, Joachim Kandler, Bruhl, near Cologne, Rolf Sommerfeld, Stetten, Remstal, and Günter Sorbe, Bruhl, near Cologne, Germany, assignors to Knapsack-Griesheim Aktiengesellschaft, Knapsack, near Cologne, Germany, a corporation of Germany
Filed Apr. 15, 1964, Ser. No. 361,931
Claims priority, application Germany, Dec. 7, 1960, K 42,334
5 Claims. (Cl. 260—465.3)

This application is a continuation-in-part application of application Serial No. 155,309, filed November 28, 1961, and now abandoned.

The present invention provides a process for preparing unsaturated nitriles by reacting olefins with oxygen and ammonia in the presence of a catalyst. More particularly, it relates to the preparation of acrylonitrile using propylene as the starting material and of methacrylonitrile using isobutylene as the starting hydrocarbon.

Various catalysts have been known which enable olefins to be directly converted into unsaturated nitriles. Thus, it has been proposed in U.S. Patent 2,904,580, to Idol, that a catalyst comprising bismuth oxide, molybdenum oxide and phosphorus oxide be used. The conventional processes are, however, unsatisfactory for the reason that the yield per volume of catalyst, that is to say the quantity of nitrile formed per hour and per liter of catalyst, is very small. The expression "yield per volume of catalyst" is defined as follows:

$$\frac{\text{Quantity of nitrile formed (in grams)}}{\text{Liter of catalyst} \cdot \text{time (in hours)}} = \frac{\text{grams}}{\text{liters} \cdot \text{hours}} \text{ of nitrile}$$

Thus, the activity of the catalyst used in Example 7 of the above U.S. patent for reacting propylene with ammonia and air into acrylonitrile is limited to a maximum yield of about 20 grams of nitrile per liter and per hour when the reaction is carried out under atmospheric pressure, the yield being calculated with the proviso that the catalyst has a bulk density of 0.5.

The poor yield per volume of catalyst is associated with a poor and unsatisfactory utilization of the active components of the catalyst which are generally oxidic and in most cases expensive. When the equation:

$$\frac{\text{Quantity of nitrile formed (in kilograms)}}{\text{Quantity of active components} \cdot \text{time}} = \frac{\text{kg.}}{\text{kg.} \cdot \text{h.}} \text{ of nitrile}$$
$$\text{(in kilograms)} \quad \text{(in hours)}$$

is used to define the activity of the catalyst components, it is found that the catalyst component activity of the catalyst comprising bismuth oxide, molybdenum oxide and added phosphorus oxide used in Example 7 of U.S. Patent No. 2,904,580, for which the catalyst volume yield has been indicated, amounts to about 0.131 kilogram of acrylonitrile per kilogram of $MoO_3$ per hour and about 0.108 kilogram of acrylonitrile per kilogram of $Bi_2O_3$ per hour.

The poor yield per volume of catalyst and the poor activity of the catalyst components are very unsatisfactory for the reason that the commercial production of a definite quantity of nitrile calls for the use of very large quantities of catalyst and reaction vessels having suitable dimensions. This results in great expenses of apparatus and catalyst.

The present invention unexpectedly provides a process which enables a given quantity of nitrile to be produced with a considerably smaller quantity of catalyst and, accordingly, smaller proportions of expensive active components. In the process according to the present invention the yield per volume of catalyst and the activity of the catalyst components are much higher than in the known processes.

It is further pointed out that U.S. Patent 2,904,580, to Idol, is concerned with the direct transformation of propylene by means of oxygen and ammonia into acrylonitrile on catalysts which contain (a) bismuth, tin or antimony compounds and (b) molybdenum, tungsten and optionally phosphorus compounds. While the yields obtained all are rather small, the acetonitrile as an undesired by-product is obtained in rather substantial proportions. As compared with Idol, it would appear that the essential feature in which the present subject matter differs from Idol resides in the content of iron as an additional catalyst component and in the omission of such metals as tungsten, antimony and tin.

U.S. Patent 3,009,943, to Hadley et al., is concerned with a two-stage process wherein in the first stage an olefin is transformed into unsaturated aldehyde and various other compounds (cf. column 1, lines 35 to 38), such as formaldehydes, acrylic acid and acetic acid (cf. column 2, lines 44 to 45) in the presence of selenium, and in the second stage the crude gas so produced is transformed in the presence of another catalyst, preferably copper or molybdenum, into acrylonitrile. In contradistinction thereto, the present process as described below is directed to a one stage process with the particular advantage that the olefin can be directly transformed on one and the same catalyst which is free from selenium and copper, into acrylonitrile without acrolein being formed.

U.S. Patent 2,691,037, to Bellringer et al., describes the manufacture of unsaturated nitriles from $\alpha,\beta$-unsaturated aliphatic aldehydes or compounds yielding same under the reaction conditions. These latter compounds clearly do not include olefins (cf. column 1, line 49 through column 2, line 4). As already mentioned, the present process is not burdened with acrolein formation so that the disadvantages otherwise encountered, for example with that particular compound, for instance the danger of polymerization, are avoided. Bellringer et al. uses acrolein as the starting material, hence is based on positively different prerequisites and, therefore, has nothing to do with the present invention.

The good yields are the result of an unexpectedly high catalytic efficiency of the very active catalyst with its specific composition and, if desired, specific grain size, which is used in the process of this invention. The process is advantageously carried out in a fluidized bed reactor.

Iron-containing catalysts are particularly suitable for the catalytic reaction of olefins with ammonia and oxygen or air in the gaseous phase. The addition of iron is especially advantageous for propylene treatment in reducing undesired acetonitrile formation, which must be separated from acrylonitrile by complicated methods and ultimately destroyed for lack of useful application. The catalyst used in the process of this invention comprises iron oxide, bismuth oxide, molybdenum oxide and small proportions of phosphorus oxide, deposited on a carrier. The carrier is preferably silicic acid, but other inert materials such as pulverized pumice, kieselguhr, aluminum oxide or silicon carbide may also be used. The catalyst contains the carrier material in relatively large proportions and therefore has a strength sufficient to enable its use in a fluidized bed, associated with good abrasion resistance. The composition of the active oxide mixture may vary within wide limits. If the catalyst composition is defined by the general formula $Fe_aBi_bMo_cP_d$, while omitting the oxygen component, in which the symbols $a$, $b$, $c$ and $d$ indicate the atomic proportion in which the individual components are present, $a$ may be within the range of 0.1 to 3, $b$ may be within the range of 0.5 to 1.5, $c$ may be within the range of 0.5 to 2 and $d$ may be within the range of 0.05 to 0.5.

The active components may be deposited on the carrier in known manner, for example, by evaporating a solution of a corresponding salt, for example a nitrate, jointly with a colloidal solution, suspension or paste of the carrier material. The proportion of carrier material amounts to 30 to 95% by weight, advantageously 50 to 80% by weight, of the finished catalyst.

The catalyst is used in a flowing or fluidized bed reactor, and preferably moved therein, the grains of the catalyst having a diameter within the range of 0.01 to 1.0 millimeter, preferably 0.05 to 0.5 millimeter. A solid bed catalyst may also be used.

The present invention thus provides a novel catalyst, preferably for use in a fluidized bed reactor, which is distinguished by the high substance yield obtained per unit of catalyst volume and the good catalytic efficiency of its components. The yield per volume of catalyst amounts to 100 to 140 grams of acrylonitrile per liter and per hour in the process of this invention depending on the mode of executing it. The activity of the catalyst components yields 1.0 to 1.6 kilograms of acrylonitrile per kilogram of $MoO_3$ and per hour and 0.9 to 1.3 kilograms of acrylonitrile per kilogram of $Bi_2O_3$ and per hour.

These yields are obtained when the process is carried out under atmospheric pressure. The activity of the catalyst can be further increased by operating under superatmospheric pressure. In other words, considerably less reaction space is required and considerable amounts of costly active salts can be saved as compared with prior processes. The additional expense of cheap iron salt or iron oxide, are negligible.

Furthermore, the catalyst of this invention has an efficiency sufficient to work at temperatures lower than in the known processes. In the process of the above-mentioned U.S. Patent 2,904,580 the preferred temperatures are within the range of 427° to 510° C. In contrast, the process of the present invention is carried out at temperatures within the range of 300° to 500° C., preferably 375° to 475° C. This is an important temperature drop for the reason that about 400° C. is the upper processing temperature applicable to a number of organic liquids used as heat transfer agents, which in commercial production are advtantageously fed to the cooling means in the fluidized bed reactor. For example, terphenyls or mixtures of terphenyls or the eutectic mixture of diphenyl and diphenyl oxide are thermally stable at temperatures of up to about +400° C.

The high efficiency of the catalyst is associated with a high selectivity manifesting itself in the high yields and the high conversion rates heretofore not obtainable. For propylene treatment, the yields of useful products, that is acrylonitrile, acetonitrile and hydrocyanic acid, which will hereinafter be referred to as total quantity of nitriles, amount to 82 to 87%, calculated on the propylene converted or to 95 to 99%, calculated on the ammonia converted. The yields are defined as follows:

Yield in percent, calculated on propylene =

$$\frac{\text{mols of carbon present in the nitriles formed}}{\text{mols of converted propylene} \cdot 3} \cdot 100$$

Yield in percent, calculated on ammonia =

$$\frac{\text{mols of nitrogen contained in the nitriles formed}}{\text{mols of converted ammonia}} \cdot 100$$

The conversion rate in per cent designates as usual the ratio of mols propylene or ammonia which underwent conversion to mols propylene or ammonia used as the starting material.

In a manner analogous to the good yield, the conversion rates may amount to more than 90%. This method of workng offers the further advantage that unconverted portons of propylene and ammonia need not be returned. Acrylonitrile, acetonitrile and hydrocyanic acid may, for example, be separated in the usual manner from the off-gas leaving the reaction vessel by washing the said off-gas with dilute sulfuric acid, the ammonia being neutralized thereby. The washed off-gas may be rejected. It merely contains small quantities of propylene.

The pressure under which the reaction is carried out is of no decisive importance, since it does not appreciably influence the efficiency of the catalyst. If it is desired to increase the efficiency of the catalyst to such an extent that the yields exceed those mentioned above, the process may be carried out under a slightly superatmospheric pressure. In this context, it should, however, be noted that even at atmospheric pressure the catalyst efficiency is extremely high. In general a pressure within the range of 0.3 to 10 atmospheres (absolute), preferably 1 to 5 atmospheres (absolute), is applied.

While the residence time of the gas mixture in the reaction vessel may vary within certain limits, it is not an independent variable in a fluidized bed process. The fluidized bed should preferably be charged at the catalyst discharge limit. For each grain size the discharge limit is determined by a specific speed of the flowing gas mixture. To facilitate an understanding, it may be mentioned that the gas flow speed may be adjusted so as to reach or go beyond the discharge limit for a portion of the catalyst, but to remain below the discharge limit for another catalyst portion. Under such working conditions at the catalyst discharge limit, very good yields and a very good catalyst efficiency can be obtained bearing in mind that the exchange of heat and material in the fluidized bed is already very good. On the other hand, a relatively small quantity of catalyst substance is discharged and the degree of abrasion is smaller than at comparatively higher gas flow speeds at which the catalyst is entirely liable to pneumatic transport through the reaction vessel.

Since, in order to maintain the state of fluidizing which is particularly favorable for the process of the invention, a definite speed of flow of the gas is necessary, the time of stay can only be modified by varying the height of the fluidizing bed or by diluting the reaction mixture in an appropriate manner with an inert gas. Bearing these conditions in mind, the time of stay can always be modified. It may be within the range of 0.2 to 50 seconds, preferably 0.5 to 20 seconds.

The composition of the gas mixture with which the reaction vessel is charged may vary within wide limits. The proportion of $NH_3$ to olefinic hydrocarbon is preferably within the range of 1.0 to 1.5 in order to prevent the formation of unsaturated aldehydes. The proportion of oxygen to olefinic hydrocarbon is preferably within the range of 1.5 to 2.5. The oxygen may be used in the form of air.

It has also proved advantageous to add an inert gas, for example, nitrogen, a saturated hydrocarbon, steam or carbon dioxide, to the reaction mixture, the addition of steam and/or carbon dioxide having proved particularly useful.

The following remarks are made with regard to the execution of the process of this invention. In a one-stage process for the manufacture of a compound selected from the group consisting of acrylonitrile and methacrylonitrile by reacting a gas selected from the group consisting of propylene and isobutylene respectively, with ammonia and a substance selected from the group consisting of air and oxygen at about 300–500° C. under a pressure of about 0.3 to 10 absolute atmospheres on catalysts applied to a carrier selected from the group consisting of silicic acid, pulverized pumice, kieselguhr, aluminum oxide, silicon carbide and mixtures thereof, and with a residence time on the catalyst between 0.2 and 50 seconds, the present invention resides in the improvement of using a catalyst consisting of $Fe_2O_3$, $Bi_2O_5$, $MoO_3$ and $P_2O_5$, in which the oxide-forming elements are present in the atomic proportion $Fe_{0.1-3.0}Bi_{0.5-1.5}Mo_{0.5-2.0}P_{0.05-0.5}$, the catalyst being applied to the carrier so as to form grains having a diameter of about 0.01 to 1.0 millimeter, and the gas mixture containing 1.5 to 2.5 mols of oxygen, 1.0 to 1.5 mols of ammonia and 0 to 20 mols of water in the form of steam per mol of propylene and isobutylene, respectively.

A part of the air or oxygen may be introduced secondarily into the reaction zone. Carbon dioxide, nitrogen, saturated hydrocarbons or mixtures thereof may be added as diluents to the gas mixture in the present process.

The quantity of the carrier material amounts to about 30 to 95% by weight, preferably 50 to 80% by weight, of the finished catalyst.

According to another embodiment of the invention, a solution of ammonium molybdate and phosphoric acid is added in the preparation of the catalyst to an aqueous solution of an iron salt and a bismuth salt, the resulting suspension is evaporated to dryness with, for example, colloidal silicic acid serving as carrier material, and the residue is sintered at an elevated temperature. As metal salts there may be used, for example, the nitrates, if desired dissolved in nitric acid, or the ammonia salts of the metals concerned. As bismuth salt there may be used, for example, bismuth nitrate and as iron salt ferric nitrate. Instead of ammonium molybdate molybdenum oxide, molybdic acid or phosphorus-molybdic acid may be used. Silicic acid which serves as carrier material is introduced into the solution in the colloidal state or silica gel serving as carrier material is introduced into the solution in lumps having a diameter of about 2 to 4 millimeters. The catalyst mass is finally sintered at a temperature within the range of about 300° to 1100° C., preferably about 400° to 600°.

The process of the present invention may in particular be carried out with about 1 part by volume of propylene, 1 part of ammonia, 7.5 to 12 parts of air and a diluent selected from the group consisting of steam, carbon dioxide, nitrogen and saturated hydrocarbons, at a temperature in the range of about 375° C. to 475° C., under a pressure ranging from normal pressure to about 5 absolute atmospheres, and with a residence time of the gas mixture on the catalyst between 0.5 and 20 seconds, the catalyst being used in the form of grains having a diameter within the range of about 0.05 to 0.5 millimeter.

The process of the present invention is carried out in a flowing bed reactor or preferably in a fluidized bed reactor. When the process is carried out in a fluidized bed reactor, a speed of flow is maintained which is near the catalyst discharge limit.

It is not necessary to use a certain type of reactor for carrying out the process of the invention. However, two forms of apparatus have proved particularly useful. They will now be described in greater detail by way of example with reference to the accompanying drawings.

Referring now to the drawings, the apparatus shown in FIG. 1 comprises a reaction vessel provided internally with a means for reconducting the catalyst discharged from the fluidized bed. The starting gas mixture is introduced via conduit 17 through perforated bottom 2 into reaction tube 3, catalyst substance 4 charged into the reaction tube attaining approximately height limit 5. The gas whirls up the catalyst and entrains it into quiescent vessel 6 whose inside cross-sectional area is approximately five times as large as that of reaction tube 3 and in which the flow speed of the gas is reduced and drops to below the speed of discharge of substantially all grain size, so that the catalyst falls back into reaction tube 3. Small quantities of the catalyst, in particular of the pulverulent portion of the catalyst, which do not fall back are separated in cyclone 7 and fall back through pipe 8 into reaction tube 3. The lower end of fall pipe 8 is screened by means of cup 9 in order to prevent the gas introduced at 17 from penetrating from the bottom into fall pipe 8. The gas leaves cyclone 7 via off-gas pipe 10.

Reaction tube 3 is maintained at the desired reaction temperature while quiescent vessel 6 and off-gas pipe 10 are maintained at about 300° C. Along the whole length of reaction tube 3 are distributed short pipes 11 which serve for the arrangement of thermoelements, for measuring the pressure and for introducing further quantities of gas. For dissipating the heat of the exothermic reaction, heat exchangers 12 are provided which may be charged with a heat transferring agent through recycle conduit 13 by means of pump 16. By means of the same recycle system the reaction may be started by heating. The heat is removed from the cycle via cooler 14 and supplied via heater 15, which cooler 14 and heater 15 may be used optionally.

Figure 2:
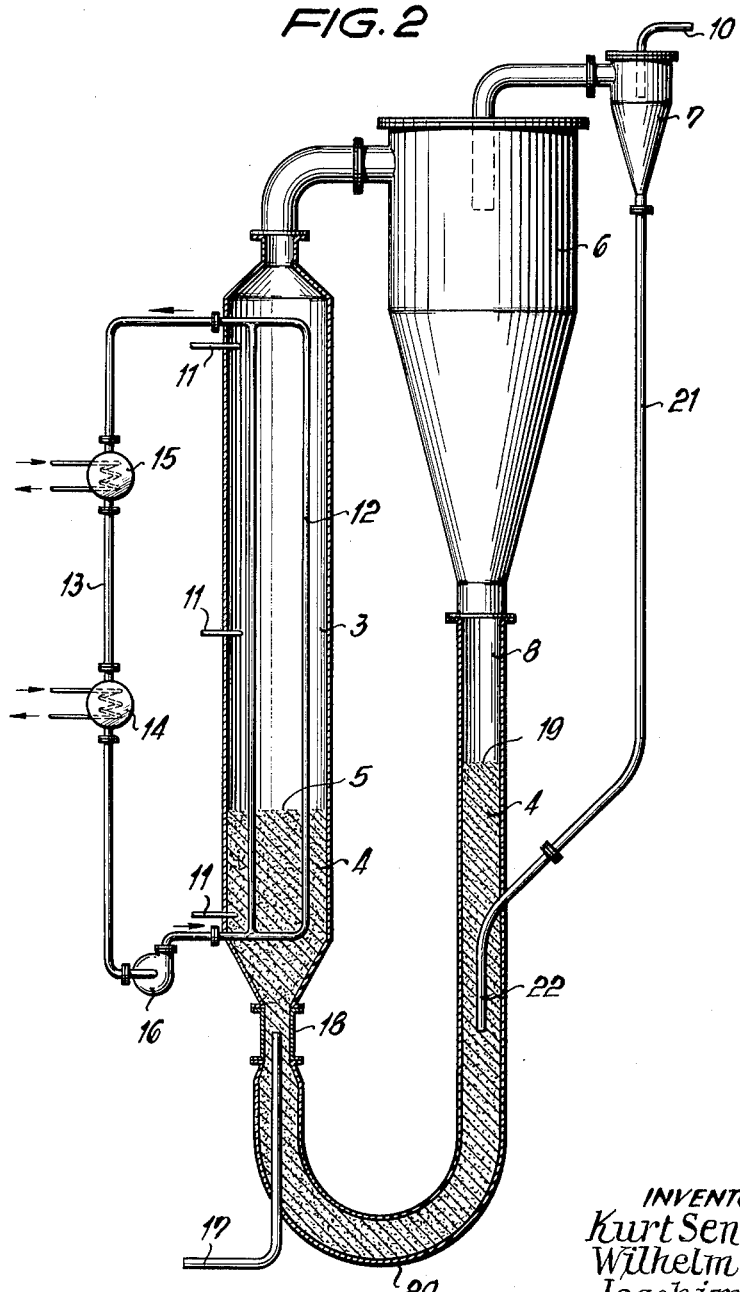

In the form of apparatus shown in FIG. 2 the catalyst is returned outside the apparatus. The starting mixture is introduced through conduit 17 at necked-down portion 18 into reaction tube 3 in which it whirls up catalyst 4 which, in the state in which it is charged into the apparatus, approximately attains height limit 5, and it partly discharges it into cyclone-shaped separator 6 from where the catalyst falls down through down-pipe 8. In down-pipe 8 the catalyst comes approximately to height limit 19. The catalyst is returned from down-pipe 8 through connecting bend 20 into reaction tube 3 by means of the current of gas entering at 18 and passing in bubbles through the catalyst. On leaving separator 6, the gas enters cyclone 7 in which the last constituents of the catalyst are retained and returned to the cycle through down-pipe 21 which is immersed within down-pipe 8 at 22 into the catalyst. The off-gases escape through off-gas pipe 10.

Reaction tube 3 is provided with means 11 serving for the arrangement of thermoelements, for measuring the pressure and for the introduction of further quantities of gas. Heat transferring cycle 13, which includes pump 16, enables heat to be eliminated from reaction tube 3 through heat exchange elements 12 or the reaction to be initiated by heating. The heat transferrer may be cooled by cooler 14 and heated by heater 15.

The following examples serve to illustrate the invention but they are not intended to limit it thereto.

*Example 1*

For the preparation of a catalyst according to the invention the following solutions were prepared:

By dissolving iron nitrate $Fe(NO_3)_3 \cdot 9H_2O$ in water, a solution I was prepared which contained 0.5 gram of $Fe(NO_3)_3 \cdot 9H_2O$ per milliliter.

By dissolving bismuth nitrate $Bi(NO_3)_3 \cdot 5H_2O$ in nitric acid of 6 to 7% strength, a solution II was prepared which contains 1.0 gram of $Bi(NO_3)_3 \cdot 5H_2O$ per milliliter.

By dissolving ammonium paramolybdate $$(NH_4)_6Mo_7O_{24} \cdot 4H_2O$$

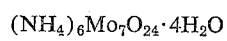

in water, a solution III was prepared which contained 0.5 gram of $(NH_4)_6Mo_7O_{24} \cdot 4H_2O$ per milliliter.

730 ml. of solution I, 438 ml. of solution II, 416 ml. of solution III and 10 ml. of phosphoric acid of 85% strength were combined and 4900 grams of colloidal silicic acid of 14% strength were stirred into the solution prepared in the aforesaid manner. The mixture was evaporated until it acquired the form of a paste. The mass so obtained was dried for 24 hours at +150° C. and subsequently roasted for 16 hours at +500° C. The roasted catalyst was ground and the grains having a diameter of 0.1 to 0.2 millimeter and those having a diameter of 0.2 to 0.3 millimeter were sieved out. The catalyst which had been prepared in this manner had the following composition:

18.3% by weight of $Bi_2O_3$,
14.8% by weight of $MoO_3$,
6.3% by weight of $Fe_2O_3$,
0.9% by weight of $P_2O_5$,
59.7% by weight of $SiO_2$.

The proportion of the active components corresponded to the formula $Fe_{1.0}Bi_{1.0}Mo_{1.3}P_{0.16}$.

1.25 liters of the catalyst described above were introduced into a fluidized bed reactor as shown in FIG. 1, the reaction tube of which had a length of about 4 meters and an inside cross-sectional area of about 15 square centimeters. More than 90% of the catalyst substance were constituted of grains having a diameter of 0.2 to 0.3 millimeter. The bulk density of the catalyst was 0.605 gram per milliliter. The reaction vessel was kept at a temperature of $+425°$ C. and the following quantities of gas were introduced via a premixing apparatus:

1,000 liters per hour of air,
140 liters per hour of propylene,
140 liters per hour of ammonia,
500 liters per hour of steam.

(The volumes were measured at 25° C. under a pressure of 760 mm. of mercury.)

The flow speed of the gas mixture in the reaction tube was about 77 centimeters per second and the time of stay in the reaction vessel amounted to about 5.3 seconds. These values apply, however, only to the empty tube and are consequently only apparent values.

In order to determine the conversion rate and the yield, the off-gas was washed in known manner with 2 N-sulfuric acid and the dissolved products, viz. hydrocyanic acid, acetonitrile and acrylonitrile, were jointly distilled off from the sulfuric acid solution. The content of unreacted ammonia was determined by backtitration of the sulfuric acid. The components of the off-gas escaping during the washing with sulfuric acid were ascertained by analysis in known manner. 191 grams per hour of a crude distillation product were obtained which had the following composition:

71.6% by weight of acrylonitrile,
6.2% by weight of acetonitrile,
13.9% by weight of hydrocyanic acid,
8.1% by weight of water,
<0.01% by weight of propionic acid nitrile,
0.1% by weight of carbon dioxide,
0.04% by weight of propylene.
and traces of further impurities such as aldehydes.

The residual gas contained 52.8 grams of $CO_2$ and 16.8 grams of CO.

The conversion rate amounted to 64.7%, calculated on the propylene used, or to 68.5%, calculated on the ammonia used.

The yields, calculated on propylene that had undergone conversion, were:

69.6% by weight of acrylonitrile,
5.2% by weight of acetonitrile,
8.9% by weight of hydrocyanic acid.

This corresponds to a total yield of 83.7%.

The yields, calculated on ammonia that had undergone conversion, were:

65.8% of acrylonitrile,
7.4% of acetonitrile,
25.1% of hydrocyanic acid.

This corresponds to a total yield of 98.3%.

The efficiency of the catalyst was:
Yield per volume of catalyst:
  109 grams of acrylonitrile per liter of catalyst and per hour;
Activity of the catalyst components:
  1.23 kilograms of acrylonitrile per kilogram of $MoO_3$ and per hour;
  0.99 kilogram of acrylonitrile per kilogram of $Bi_2O_3$ and per hour; or
  0.55 kilogram of acrylonitrile per kilogram of $MoO_3+Bi_2O_3$ and per hour.

*Example 2*

1.25 liters of a catalyst prepared in the manner described in Example 1, more than 90% of which had a grain size of 0.1 to 0.2 millimeter and which had a bulk density of 0.615 gram per milliliter were introduced into a reaction vessel analogous to that described in Example 1.

The reaction vessel was kept at a temperature of $+450°$ C. and the same quantities of gas as those indicated in Example 1 were introduced. The apparent flow speed of the gas mixture amounted to about 80 centimeters per second. The apparent time of stay was about 5 seconds. The further treatment of the off-gas and the determination of yield and extent of conversion were brought about in the manner described in Example 1.

228 grams of a crude distillation product were obtained which had the following composition:

74.3% by weight of acrylonitrile,
4.7% by weight of acetonitrile,
12.1% by weight of hydrocyanic acid,
8.7% by weight of water,
0.03% by weight of propionic acid nitrile,
0.03% by weight of propylene,
0.1% by weight of carbon dioxide,
and traces of further impurities such as aldehydes.

The residual gas contained 48.6 grams of $CO_2$ and 16.4 grams of CO.

74.5% of propylene and 82.0% of ammonia underwent reaction.

The yields, calculated on propylene that had undergone conversion, amounted to:

74.8% of acrylonitrile,
4.1% of acetonitrile,
8.0% of hydrocyanic acid.

This corresponds to a total yield of 86.9%.

The yields, calculated on ammonia that had undergone conversion, amounted to 68.1% of acrylonitrile,
5.6% of acetonitrile,
21.7 of hydrocyanic acid.

This corresponds to a total yield of 95.4%.

The efficiency of the catalyst was:
Yield per volume of catalyst:
  135.5 grams of acrylonitrile per liter of catalyst and per hour;
Activity of the catalyst components:
  1.5 kilograms of acrylonitrile per kilogram of $MoO_3$ and per hour;
  1.21 kilograms of acrylonitrile per kilogram of $Bi_2O_3$ and per hour; or
  0.67 kilogram of acrylonitrile per kilogram of $(MoO_3+Bi_2O_3)$ and per hour.

*Example 3*

2.25 liters of the catalyst described in Example 1 were introduced into a fluidized bed reactor as shown in FIG. 1, the reaction tube of which had a length of about 7 meters and an inside cross-sectional area of 15 square centimeters. More than 90% of the catalyst mass had a

| Composition of catalyst | Percent conversion | | Percent yield, referred to propylene converted | | |
|---|---|---|---|---|---|
| | Propylene | NH₃ | Acrylonitrile | Acetonitrile | HCN |
| (4) Bi₁Fe₀.₁Mo₃.₁P₀.₁₆ plus about 60% SiO₂ | 85 | 86 | 75 | 0.7 | 9.2 |
| (5) Bi₁Fe₀.₅Mo₁.₃P₀.₁₆ plus about 60% SiO₂ | 84 | 86 | 74 | 1.5 | 8 |
| (6) Bi₁Fe₁.₅Mo₁.₃P₀.₁₆ plus about 60% SiO₂ | 92 | 95 | 68.5 | 3.0 | 7.8 |
| (7) Bi₁Fe₃.₀Mo₁.₃P₀.₁₆ plus about 60% SiO₂ | 91 | 90 | 67.9 | 1.2 | 10.0 | grain size of 0.1 to 0.2 millimeter. The catalyst had a bulk density of 0.615 gram per cubic centimeter.

The reaction vessel was kept at a temperature of +463° C. The following quantities of gas were introduced into the reaction vessel via a premixing apparatus:

1,450 liters per hour of air,
175 liters per hour of propylene,
175 liters per hour of ammonia,
850 liters per hour of steam.

Besides, through each of the feed pipes arranged at the side of the reaction vessel at a height of 2, 3 and 4 meters, respectively, 90 liters per hour of air were introduced. (The aforesaid volumes were measured at 25° C. under a pressure of 760 mm. of mercury.)

The apparent speed of flow amounted to about 133 centimeters per second and the apparent time of stay was 5.3 seconds.

The further treatment of the off-gas and the determination of the yield and the extent of conversion were brought about in the manner described in Example 1.

336 grams per hour of a crude distillation product were obtained which had the following composition:

73.4% by weight of acrylonitrile,
3.2% by weight of acetonitrile,
14.2% by weight of hydrocyanic acid,
9.0% by weight of water and
0.2% by weight of carbon dioxide, propionic acid nitrile, propylene and traces of further impurities.

The residual gas contained 73.5 grams of $CO_2$ and 51.3 grams of CO.

The extent of conversion amounted to 92.1%, calculated on the propylene used, and to 94.4%, calculated on the ammonia used.

The yields are indicated in the following table:

| Yield of— | Calculated on— | |
|---|---|---|
| | Propylene | Ammonia |
| Acrylonitrile, percent | 70.7 | 68.9 |
| Acetonitrile, percent | 2.6 | 3.9 |
| Hydrocyanic acid, percent | 8.9 | 26.2 |
| Total yield, percent | 82.2 | 99.0 |

The yield per volume of catalyst amounted to about 109 grams per liter of catalyst and per hour.

*Examples 4–7*

The catalyst $Bi_{1.0}Fe_{1.0}Mo_{1.3}P_{0.16}$ used in Example 1 was replaced by the following catalysts prepared in analogous manner. The whole catalyst, consisting of active catalyst and carrier, contained in each example about 60% by weight SiO as the carrier. The conversions took place under the conditions set forth in Example 3. Conversion rate and yield are indicated in the following table:

We claim:
1. In a one-stage process for the manufacture of a compound selected from the group consisting of acrylonitrile and methacrylonitrile by reacting an olefin selected from the group consisting of propylene and isobutylene, respectively, with a gas mixture of ammonia and a member selected from the group consisting of air and oxygen at about 300° C. to 500° C. under a pressure of about 0.3 to 10 absolute atmospheres on catalysts applied to a carrier selected from the group consisting of silicic acid, pulverized pumice, kieselguhr, aluminum oxide, silicon carbide and mixtures thereof, and with a residence time on the catalyst between 0.2 and 50 seconds, the improvement of carrying out said reaction on said catalyst consisting of $Fe_2O_3$, $Bi_2O_3$, $MoO_3$ and $P_2O_5$, with an atomic proportion of the oxide forming elements of

$$Fe_{0.1-3.0}Bi_{0.5-1.5}Mo_{0.5-2.0}P_{0.05-0.5}$$

the catalyst applied to the carrier forming grains having a diameter of about 0.01 to 1.0 millimeter, the quantity of said carrier material amounting to about 30 to 95% by weight of the finished catalyst, and said gas mixture containing 1.5 to 2.5 mols of oxygen, 1.0 to 1.5 mols of ammonia and 0 to 20 mols of water in the form of steam per mol of said olefin.

2. The process of claim 1 wherein a member selected from the group consisting of carbon dioxide and nitrogen is added to the gas mixture.

3. The process of claim 2 wherein the reaction is carried out with about 1 part by volume of propylene, 1 part of ammonia and 7.5 to 12 parts of air at a temperature in the range of about 375° C. to 475° C., under a pressure ranging from normal pressure to about 5 absolute atmospheres, and with a residence time of the gas mixture on the catalyst between 0.5 and 20 seconds, the catalyst being used in the form of grains having a diameter within the range of about 0.05 to 0.5 millimeter.

4. The process of claim 1 wherein a flowing bed reactor is used.

5. The process of claim 1 wherein a fluidized bed reactor is used.

References Cited by the Examiner

UNITED STATES PATENTS

| 2,481,826 | 9/1949 | Cosby | 260—465.3 |
| 2,691,037 | 10/1954 | Bellringer | 260—465.9 |
| 3,009,943 | 11/1961 | Hadley et al. | 260—465.3 |
| 3,118,928 | 1/1964 | Garrison | 260—465.3 |

FOREIGN PATENTS 243,315   7/1960   Australia.

OTHER REFERENCES

Derwent: "Belgian Report No. 66A," July 15, 1960, page A23.

CHARLES B. PARKER, *Primary Examiner.*